(12) United States Patent
Shimura

(10) Patent No.: US 11,785,555 B2
(45) Date of Patent: Oct. 10, 2023

(54) COMMUNICATION DEVICE, INFORMATION PROCESSING DEVICE, CONTROL METHOD, AND PROGRAM

(71) Applicant: CANON KABUSHIKI KAISHA, Tokyo (JP)

(72) Inventor: Hajime Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/116,876

(22) Filed: Dec. 9, 2020

(65) Prior Publication Data

US 2021/0092689 A1 Mar. 25, 2021

Related U.S. Application Data

(63) Continuation of application No. 16/684,446, filed on Nov. 14, 2019, now Pat. No. 10,893,484, which is a (Continued)

(30) Foreign Application Priority Data

Mar. 18, 2016 (JP) .................................. 2016-056018

(51) Int. Cl.
*H04W 52/30* (2009.01)
*H04W 52/24* (2009.01)
(Continued)

(52) U.S. Cl.
CPC ........ *H04W 52/245* (2013.01); *H04B 17/318* (2015.01); *H04W 48/06* (2013.01);
(Continued)

(58) Field of Classification Search
CPC ... H04W 48/06; H04W 52/30; H04W 52/241; H04W 52/245; H04W 52/267;
(Continued)

(56) References Cited

U.S. PATENT DOCUMENTS 5,867,796 A * 2/1999 Inutsuka ........... H04M 1/72513
455/11.1
6,377,823 B1 * 4/2002 Higuchi ................ H04M 1/724
340/7.61
(Continued)

FOREIGN PATENT DOCUMENTS

AU 2014353789 B2 6/2016
JP 200910693 A 1/2009
(Continued)

OTHER PUBLICATIONS

Arjun Bharadwaj; Qualcomm, et. al.; Power Control for UL MU; IEEE 802.11-16/0413r0, Mar. 1, 2016; pp. 1-19.
(Continued)

*Primary Examiner* — Hai V Nguyen
(74) *Attorney, Agent, or Firm* — Canon U.S.A., Inc. IP Division

(57) ABSTRACT

A communication device includes transmitting means for transmitting a signal in one or more frequency bands of a frequency channel including a plurality of frequency bands, identifying means for identifying occupancy of the plurality of frequency bands, and control means for controlling transmission power for transmitting the signal from the transmitting means, on the basis of an identification result obtained by the identifying means.

12 Claims, 7 Drawing Sheets

US 11,785,555 B2
Page 2

Related U.S. Application Data continuation of application No. 16/133,563, filed on Sep. 17, 2018, now Pat. No. 10,512,045, which is a continuation of application No. PCT/JP2017/006132, filed on Feb. 20, 2017.

(51) Int. Cl.

| | |
|---|---|
| *H04W 52/26* | (2009.01) |
| *H04B 17/318* | (2015.01) |
| *H04W 48/06* | (2009.01) |
| *H04W 72/0453* | (2023.01) |
| *H04W 72/044* | (2023.01) |
| *H04W 74/08* | (2009.01) |
| H04W 84/12 | (2009.01) |

(52) U.S. Cl.
CPC ....... *H04W 52/241* (2013.01); *H04W 52/267* (2013.01); *H04W 72/0453* (2013.01); *H04W 72/0473* (2013.01); *H04W 74/0808* (2013.01); H04W 52/30 (2013.01); H04W 74/0816 (2013.01); H04W 84/12 (2013.01)

(58) Field of Classification Search
CPC ......... H04W 72/0453; H04W 72/0473; H04W 74/0808; H04W 74/0816; H04W 84/12; H04B 52/245
USPC ........................................................ 455/522
See application file for complete search history.

(56) References Cited

U.S. PATENT DOCUMENTS

| | | | | |
|---|---|---|---|---|
| 6,405,052 | B1 | 6/2002 | Faber | |
| 7,260,401 | B2* | 8/2007 | Chen | H04W 76/19 455/437 |
| 8,099,055 | B2* | 1/2012 | Bonneville | H04W 24/00 455/67.11 |
| 8,352,631 | B2* | 1/2013 | Cai | H04L 1/0028 709/236 |
| 8,654,741 | B2* | 2/2014 | Lundsgaard | H04W 48/20 370/332 |
| 8,849,337 | B2* | 9/2014 | Chande | H04W 24/10 455/69 |
| 9,077,415 | B2* | 7/2015 | Josiam | H04L 25/0204 |
| 9,397,805 | B2* | 7/2016 | Vermani | H04L 5/0044 |
| 9,408,184 | B2* | 8/2016 | Kwon | H04W 74/004 |
| 9,467,379 | B2* | 10/2016 | Merlin | H04W 72/0446 |
| 9,622,267 | B2* | 4/2017 | Kwon | H04W 4/06 |
| 9,750,038 | B2* | 8/2017 | Ghosh | H04L 25/0224 |
| 9,788,320 | B2* | 10/2017 | Cattoni | H04W 48/16 |
| 9,854,606 | B2* | 12/2017 | Seok | H04W 74/04 |
| 9,967,827 | B2* | 5/2018 | Rong | H04W 52/146 |
| 10,021,694 | B2* | 7/2018 | Noh | H04W 74/0816 |
| 10,104,688 | B2* | 10/2018 | Seok | H04W 74/04 |
| 10,201,009 | B1* | 2/2019 | Wang | H04W 76/10 |
| 10,201,017 | B2* | 2/2019 | Sun | H04W 8/24 |
| 10,277,383 | B2* | 4/2019 | Min | H04L 5/0053 |
| 10,278,208 | B2* | 4/2019 | Choi | H04W 84/12 |
| 10,305,659 | B2* | 5/2019 | Chu | H04L 5/0007 |
| 10,321,446 | B2* | 6/2019 | Yang | H04L 5/0053 |
| 10,334,571 | B2* | 6/2019 | Chu | H04W 72/005 |
| 10,375,679 | B2* | 8/2019 | Chu | H04W 72/0413 |
| 10,397,024 | B2* | 8/2019 | Li | H04L 5/0044 |
| 10,397,955 | B2* | 8/2019 | Park | H04W 74/002 |
| 10,470,219 | B2* | 11/2019 | Sun | H04L 5/0044 |
| 10,499,343 | B2* | 12/2019 | Lou | H04W 52/146 |
| 10,512,045 | B2* | 12/2019 | Shimura | H04W 48/06 |
| 10,531,380 | B2* | 1/2020 | Choi | H04W 74/008 |
| 10,531,491 | B2* | 1/2020 | Choi | H04W 74/0816 |
| 10,560,896 | B2* | 2/2020 | Kim | H04W 84/12 |
| 10,575,249 | B2* | 2/2020 | Park | H04W 74/0816 |
| 10,616,891 | B2* | 4/2020 | Matsuo | H04W 72/0453 |
| 10,681,677 | B2* | 6/2020 | Ghosh | H04W 8/22 |
| 10,736,145 | B2* | 8/2020 | Choi | H04W 74/0816 |
| 10,764,874 | B2* | 9/2020 | Chu | H04W 72/005 |
| 10,764,924 | B2* | 9/2020 | Ko | H04W 84/12 |
| 10,785,795 | B2* | 9/2020 | Son | H04L 27/26 |
| 10,813,061 | B2* | 10/2020 | Fang | H04W 74/006 |
| 10,893,484 | B2* | 1/2021 | Shimura | H04B 17/318 |
| 10,897,739 | B2* | 1/2021 | Kim | H04W 52/02 |
| 10,945,245 | B2* | 3/2021 | Chu | H04L 27/2602 |
| 10,979,250 | B2* | 4/2021 | Li | H04L 25/0224 |
| 11,013,031 | B2* | 5/2021 | Park | H04W 74/002 |
| 11,102,721 | B2* | 8/2021 | Park | H04W 74/002 |
| 11,234,267 | B2* | 1/2022 | Lou | H04W 72/121 |
| 11,528,097 | B2* | 12/2022 | Cariou | H04L 5/0053 |
| 11,528,723 | B2* | 12/2022 | Shah | H04W 74/06 |
| 2002/0090965 | A1* | 7/2002 | Chen | H04W 76/10 455/434 |
| 2004/0001553 | A1* | 1/2004 | Steentra | H04L 27/2647 375/260 |
| 2006/0264179 | A1* | 11/2006 | Bonneville | H04W 24/00 455/67.11 |
| 2007/0137462 | A1* | 6/2007 | Barros | G10H 1/0058 600/595 |
| 2010/0115124 | A1* | 5/2010 | Cai | H04L 1/0028 709/236 |
| 2010/0172313 | A1* | 7/2010 | Ho | H04W 72/23 370/329 |
| 2011/0216692 | A1* | 9/2011 | Lundsgaard | H04W 48/20 370/328 |
| 2012/0046026 | A1* | 2/2012 | Chande | H04W 52/18 455/422.1 |
| 2012/0051187 | A1* | 3/2012 | Paulson | H04B 1/06 367/137 |
| 2012/0134238 | A1* | 5/2012 | Surprenant | H04S 1/007 367/137 |
| 2012/0224481 | A1* | 9/2012 | Babiarz | H04L 47/2408 370/230.1 |
| 2012/0224483 | A1* | 9/2012 | Babiarz | H04L 43/0894 370/232 |
| 2012/0224484 | A1* | 9/2012 | Babiarz | H04L 41/5019 370/235 |
| 2013/0010979 | A1* | 1/2013 | Takara | H04B 11/00 381/77 |
| 2013/0156120 | A1* | 6/2013 | Josiam | H04B 7/0617 375/260 |
| 2014/0079016 | A1* | 3/2014 | Dai | H04L 5/0041 370/329 |
| 2014/0307650 | A1* | 10/2014 | Vermani | H04L 27/261 370/329 |
| 2015/0063191 | A1* | 3/2015 | Merlin | H04W 72/0413 370/312 |
| 2015/0063257 | A1* | 3/2015 | Merlin | H04B 7/0452 370/329 |
| 2015/0208436 | A1* | 7/2015 | Seok | H04W 74/002 370/329 |
| 2015/0223241 | A1* | 8/2015 | Cattoni | H04L 5/0057 370/329 |
| 2015/0304996 | A1* | 10/2015 | Yang | H04L 1/1812 370/329 |
| 2015/0319700 | A1* | 11/2015 | Oteri | H04W 52/28 455/127.1 |
| 2016/0037484 | A1* | 2/2016 | Kwon | H04W 72/005 370/312 |
| 2016/0100370 | A1* | 4/2016 | Rong | H04W 52/146 455/522 |
| 2016/0112984 | A1* | 4/2016 | Patil | H04W 68/005 455/458 |
| 2016/0112987 | A1* | 4/2016 | Patil | H04W 8/005 455/515 |
| 2016/0113034 | A1* | 4/2016 | Seok | H04W 74/04 370/329 |
| 2016/0119894 | A1* | 4/2016 | Patil | H04W 8/005 455/515 |
| 2016/0128024 | A1* | 5/2016 | Frederiks | H04L 5/0037 370/329 |
| 2016/0142980 | A1* | 5/2016 | Lee | H04W 52/38 370/336 |

(56) References Cited

U.S. PATENT DOCUMENTS

| | | | |
|---|---|---|---|
| 2016/0165574 A1* | 6/2016 | Chu | H04L 27/2602 370/312 |
| 2016/0165589 A1* | 6/2016 | Chu | H04W 72/005 370/329 |
| 2016/0227579 A1* | 8/2016 | Stacey | H04W 74/0833 |
| 2016/0249303 A1* | 8/2016 | Kenney | H04W 24/08 |
| 2016/0262185 A1* | 9/2016 | Ghosh | H04W 72/04 |
| 2016/0302156 A1* | 10/2016 | Choi | H04L 2101/622 |
| 2016/0302185 A1* | 10/2016 | Sun | H04W 74/006 |
| 2016/0309514 A1* | 10/2016 | Kwon | H04W 74/0816 |
| 2016/0315675 A1* | 10/2016 | Seok | H04B 7/0452 |
| 2016/0323820 A1* | 11/2016 | Wong | H04W 40/005 |
| 2016/0330741 A1* | 11/2016 | Kim | H04W 72/042 |
| 2016/0330757 A1* | 11/2016 | Cherian | H04W 72/1268 |
| 2016/0366701 A1* | 12/2016 | Chu | H04W 24/10 |
| 2016/0374093 A1* | 12/2016 | Asterjadhi | H04W 72/0486 |
| 2016/0380730 A1* | 12/2016 | Ghosh | H04B 17/00 370/329 |
| 2017/0041953 A1* | 2/2017 | Zhou | H04W 74/0808 |
| 2017/0048890 A1* | 2/2017 | Sun | H04W 52/50 |
| 2017/0142721 A1* | 5/2017 | Azizi | H04L 5/0044 |
| 2017/0181187 A1* | 6/2017 | Asterjadhi | H04W 74/006 |
| 2017/0188362 A1* | 6/2017 | Cariou | H04J 11/00 |
| 2017/0195954 A1* | 7/2017 | Ghosh | H04W 52/0219 |
| 2017/0196010 A1* | 7/2017 | Matsuo | H04W 72/085 |
| 2017/0257859 A1* | 9/2017 | Li | H04L 5/0044 |
| 2017/0265191 A1* | 9/2017 | Ahmed | H04W 72/0453 |
| 2017/0272138 A1* | 9/2017 | Chun | H04L 1/1614 |
| 2017/0289911 A1* | 10/2017 | Kim | H04W 72/0446 |
| 2017/0289933 A1* | 10/2017 | Segev | H04W 72/048 |
| 2017/0294992 A1* | 10/2017 | Chu | H04L 5/0053 |
| 2017/0303280 A1* | 10/2017 | Chun | H04L 5/0053 |
| 2017/0367118 A1* | 12/2017 | Choi | H04W 84/12 |
| 2018/0014293 A1* | 1/2018 | Noh | H04W 72/0453 |
| 2018/0014327 A1* | 1/2018 | Park | H04W 74/006 |
| 2018/0048455 A1* | 2/2018 | Lim | H04B 17/345 |
| 2018/0084548 A1* | 3/2018 | Min | H04W 72/082 |
| 2018/0146426 A1* | 5/2018 | Park | H04W 52/0229 |
| 2018/0167929 A9* | 6/2018 | Chu | H04L 5/0007 |
| 2018/0184401 A1* | 6/2018 | Ghosh | H04W 72/04 |
| 2018/0205441 A1* | 7/2018 | Asterjadhi | H04W 72/0413 |
| 2018/0234924 A1* | 8/2018 | Rong | H04W 72/0473 |
| 2018/0317262 A1* | 11/2018 | Yang | H04B 17/318 |
| 2018/0332540 A1* | 11/2018 | Lou | H04W 52/10 |
| 2018/0359761 A1* | 12/2018 | Chun | H04W 72/21 |
| 2018/0359807 A1* | 12/2018 | Kim | H04W 72/0446 |
| 2019/0037504 A1* | 1/2019 | Shimura | H04W 52/241 |
| 2019/0045461 A1* | 2/2019 | Fang | H04W 52/245 |
| 2019/0191376 A1* | 6/2019 | Kim | H04W 52/0235 |
| 2019/0223220 A1* | 7/2019 | Choi | H04W 74/0816 |
| 2019/0253984 A1* | 8/2019 | Cariou | H04W 52/36 |
| 2019/0268906 A1* | 8/2019 | Perdomo | G01S 19/13 |
| 2019/0281551 A1* | 9/2019 | Kim | H04W 52/0229 |
| 2019/0289577 A1* | 9/2019 | Madhavan | H04W 8/22 |
| 2019/0313404 A1* | 10/2019 | Chu | H04W 4/06 |
| 2019/0335503 A1* | 10/2019 | Park | H04L 69/323 |
| 2019/0349857 A1* | 11/2019 | Kim | H04W 80/02 |
| 2020/0014564 A1* | 1/2020 | Li | H04L 5/0051 |
| 2020/0037356 A1* | 1/2020 | Lou | H04W 72/121 |
| 2020/0092827 A1* | 3/2020 | Shimura | H04W 52/267 |
| 2020/0092914 A1* | 3/2020 | Choi | H04W 84/12 |
| 2020/0107318 A1* | 4/2020 | Chu | H04L 27/2602 |
| 2020/0146072 A1* | 5/2020 | Sun | H04W 74/0833 |
| 2020/0196236 A1* | 6/2020 | Park | H04W 52/0229 |
| 2020/0274659 A1* | 8/2020 | Ouchi | H04L 5/0044 |
| 2020/0280399 A1* | 9/2020 | Kim | H04L 1/08 |
| 2020/0344801 A1* | 10/2020 | Epstein | H04W 80/02 |
| 2020/0404589 A1* | 12/2020 | Wang | H04W 52/0235 |
| 2021/0092678 A1* | 3/2021 | Kim | H04W 74/00 |
| 2021/0099253 A1* | 4/2021 | Kim | H04L 1/1607 |
| 2021/0266825 A1* | 8/2021 | Hwang | H04W 52/0225 |

FOREIGN PATENT DOCUMENTS

| | | |
|---|---|---|
| JP | 2010518787 A | 5/2010 |
| JP | 2015165676 A | 9/2015 |
| JP | 2020129804 A | 8/2020 |
| KR | 100345977 B1 | 7/2002 |
| KR | 20120124494 A | 11/2012 |
| KR | 20140135234 A | 11/2014 |
| WO | 2008101055 A2 | 8/2008 |
| WO | 2009023587 A3 | 5/2009 |
| WO | 2011130452 A2 | 10/2011 |
| WO | 2012121909 A1 | 9/2012 |
| WO | 2015076532 A1 | 5/2015 |

OTHER PUBLICATIONS

Robert Stacey; Specification Framework for TGax; IEEE 802.11-15/0132R15; URL:https://mentor.ieee.org/802.11/dcn/15/11-15-0132-15-00ax-spec-framework.docx; Jan. 28, 2016.

* cited by examiner

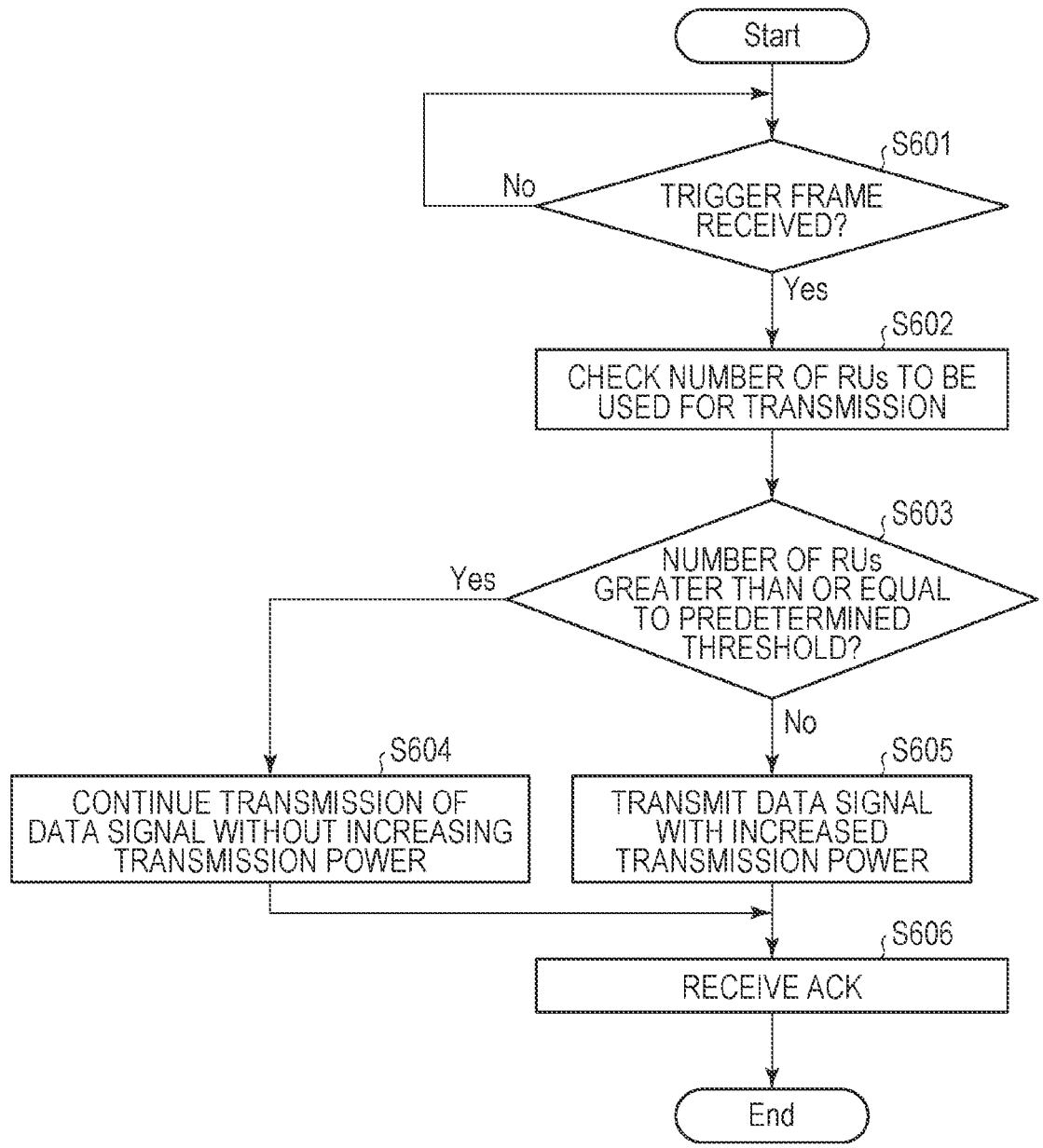

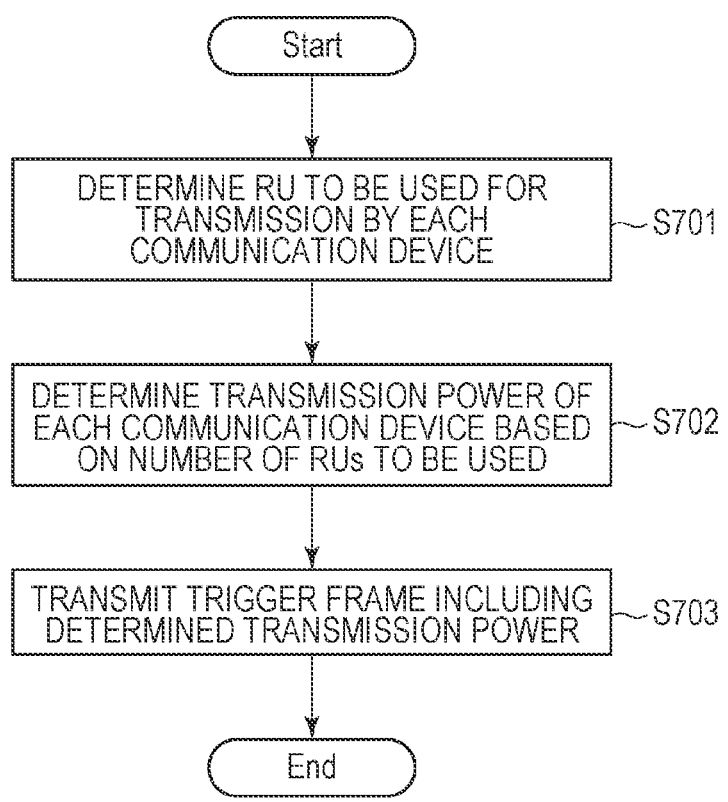

COMMUNICATION DEVICE, INFORMATION PROCESSING DEVICE, CONTROL METHOD, AND PROGRAM

CROSS-REFERENCE TO RELATED APPLICATIONS

This application is a Continuation of U.S. patent application Ser. No. 16/684,446 filed on Nov. 14, 2019 which is a continuation of U.S. patent application Ser. No. 16/133,563 filed on Sep. 17, 2018 which issued as U.S. Pat. No. 10,512,045 and which is a Continuation of International Patent Application No. PCT/JP2017/006132, filed Feb. 20, 2017, which claims the benefit of Japanese Patent Application No. 2016-056018, filed Mar. 18, 2016, all of which are hereby incorporated by reference herein in their entirety.

TECHNICAL FIELD

The present invention relates to a device that controls transmission power.

BACKGROUND ART

Communication devices that perform wireless communication conforming to the IEEE 802.11 series are being widely used. Communication devices conforming to the IEEE 802.11 series adopt an access scheme called CSMA/CA (Carrier Sense Multiple Access with Collision Avoidance). CSMA/CA specifies that before transmission of signals, carrier sensing be performed for measuring a radio field intensity for a frequency channel on which the signals will be transmitted. In carrier sensing, the radio field intensity for a width of 20 MHz, which is one frequency channel specified in IEEE 802.11, is measured.

As a result of carrier sensing, if the measured radio field intensity does not exceed a predetermined threshold, signals are transmitted; if the measured radio field intensity is greater than or equal to the predetermined threshold, signals are not transmitted.

In IEEE, IEEE 802.11ax is under examination as a successor to IEEE 802.11ac (PTL 1). In IEEE 802.11ax, it is being examined that one frequency channel is further divided into a plurality of frequency bands and the plurality of frequency bands are utilized by different devices to perform communication simultaneously.

CITATION LIST

Patent Literature

PTL 1: Japanese Patent Laid-Open No. 2015-165676

However, in a case where one frequency channel is further divided into a plurality of frequency bands and the plurality of frequency bands are utilized by different devices to perform communication simultaneously, it is conceivable that only some of the frequency bands are used for communication.

For example, in some cases, it is conceivable that a system that divides one frequency channel into four frequency bands for utilization includes only two devices that transmit data signals at a certain timing. In such cases, only two of the four frequency bands may possibly be used.

In such cases, if the transmission power per unit frequency (transmission power density) of the respective devices is the same as the transmission power density with which signals are transmitted using all of the frequency bands of one frequency channel, the transmission power for the entire frequency channel is reduced to about half.

Thus, when another communication device performs carrier sensing in CSMA/CA, due to the low transmission power for the entire frequency channel, the other communication device may fail to measure a radio field intensity exceeding a predetermined threshold and may transmit a signal.

If another communication device transmits a signal, radio wave interference occurs and an error is generated. In view of the issue described above, it is an object to enable, when a signal is to be transmitted in one or more frequency bands of a frequency channel including a plurality of frequency bands, transmission of the signal with transmission power suitable for the entire frequency channel condition.

SUMMARY OF INVENTION

A communication device of the present invention includes transmitting means for transmitting a signal in one or more frequency bands of a frequency channel including a plurality of frequency bands, identifying means for identifying occupancy of the plurality of frequency bands, and control means for controlling transmission power for transmitting the signal from the transmitting means, on the basis of an identification result obtained by the identifying means.

Further features of the present invention will become apparent from the following description of exemplary embodiments with reference to the attached drawings.

BRIEF DESCRIPTION OF DRAWINGS

FIG. 6 is a flowchart implemented by the communication device.

FIG. 7 is a flowchart implemented by a base station.

DESCRIPTION OF EMBODIMENTS

First Embodiment

Figure 1:
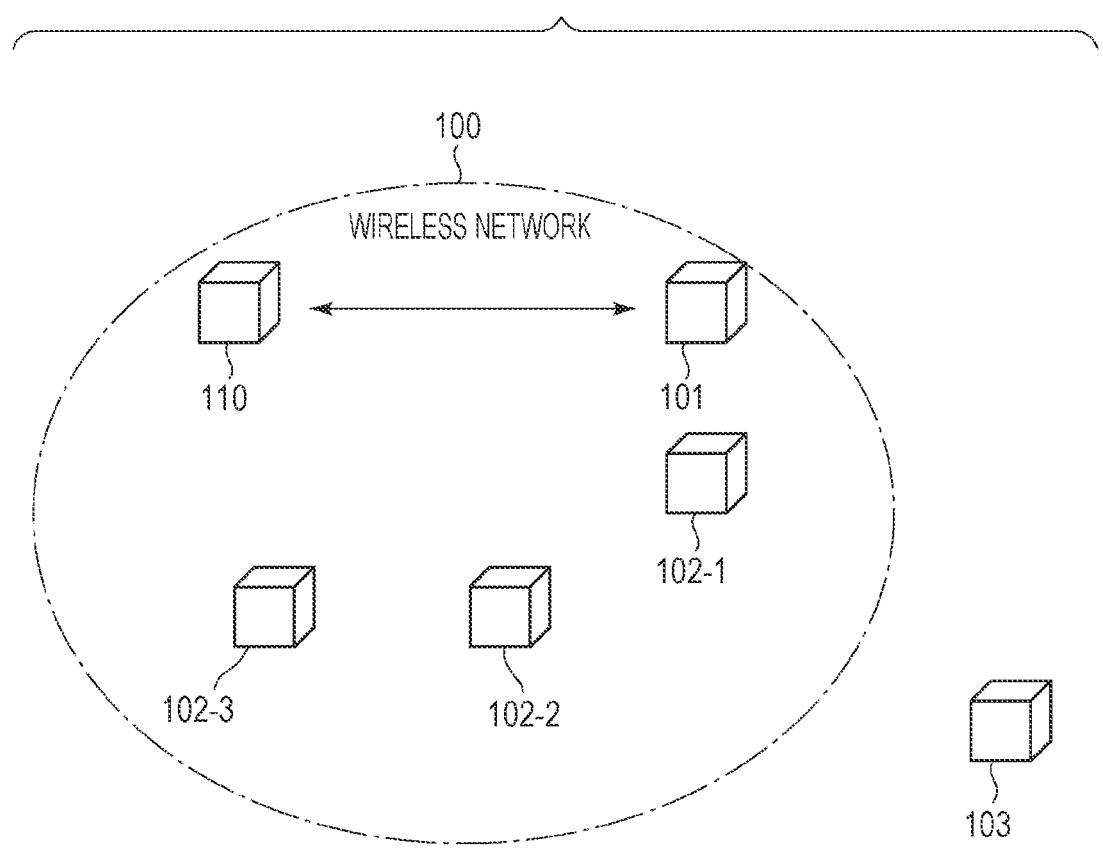
FIG. 1 is a network configuration diagram.

FIG. 1 illustrates a communication system in this embodiment. A base station 110 is an access point conforming to the IEEE 802.11 series and forms a wireless network 100. In this embodiment, the base station 110 will be described as forming the wireless network 100 conforming to IEEE 802.11ax and performing wireless communication conforming to IEEE 802.11ax. Here, IEEE is an abbreviation of the Institute of Electrical and Electronics Engineers, Inc.

A communication device 101 is a subsidiary station that takes part in the wireless network 100 formed by the base station 110. The communication device 101 performs wireless communication conforming to IEEE 802.11ax with the base station 110 over the wireless network 100. A plurality of communication devices 102 also take part in the wireless network 100 as subsidiary stations and perform wireless communication conforming to IEEE 802.11ax with the base station 110.

A communication device 103 is a legacy terminal that does not support IEEE 802.11ax, and performs wireless communication conforming to at least any one of IEEE 802.11a, b, g, n, and ac.

The communication device 103, which is a legacy terminal, performs communication in accordance with the DSSS scheme or the OFDM scheme, whereas the communication devices 101 and 102 and the base station 110 perform communication in accordance with the OFDMA scheme. Thus, if the communication device 103 receives signals from the communication devices 101 and 102 and the base station 110, the communication device 103 is unable to recognize the signals as data signals. DSSS is an abbreviation of Direct Sequence Spread Spectrum. OFDM is an abbreviation of Orthogonal Frequency Division Multiplexing. OFDMA is an abbreviation of Orthogonal Frequency-Division Multiple Access.

Thus, the communication device 103, which is a legacy terminal, uses an access scheme called CSMA/CA (Carrier Sense Multiple Access with Collision Avoidance) to prevent interference.

Specifically, before transmitting a signal, the communication device 103 performs carrier sensing for measuring a radio field intensity of a frequency channel on which the signal will be transmitted. In carrier sensing, the radio field intensity for a width of 20 MHz, which is one frequency channel specified in IEEE 802.11, is measured.

If the measured radio field intensity does not exceed a predetermined threshold, it is determined that no other communication device is performing communication on the frequency channel, and the communication device 103 transmits the signal. If the measured radio field intensity is greater than or equal to the predetermined threshold, on the other hand, it is determined that any other communication device is performing communication on the frequency channel, and the communication device 103 does not transmit the signal. Thus, the communication device 103 is prevented from interfering with other communication devices.

Figure 2:
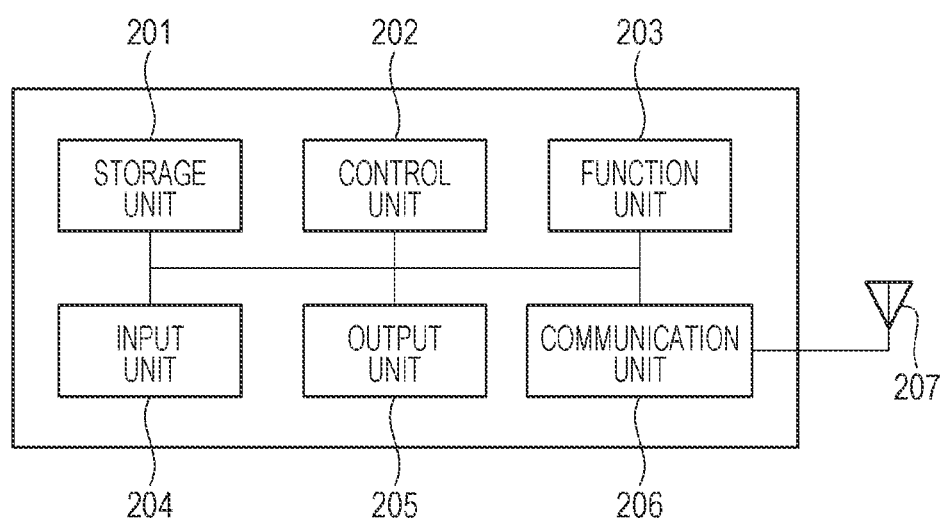
FIG. 2 is a hardware configuration diagram of a communication device.

FIG. 2 illustrates a hardware configuration of the communication device 101. The base station 110 and the other communication devices 102 are assumed to also have similar hardware configurations.

A storage unit 201 is constituted by a memory such as a ROM or a RAM and stores programs for performing various operations described below and various types of information such as communication parameters for wireless communication. The storage unit 201 may be implemented using a storage medium such as a flexible disk, a hard disk, an optical disk, a magneto-optical disk, a CD-ROM, a CD-R, a magnetic tape, a non-volatile memory card, or a DVD, other than a memory such as a ROM or a RAM. The storage unit 201 may include a plurality of memories and the like.

A control unit 202 is constituted by a processor such as a CPU or an MPU and executes a program stored in the storage unit 201 to control the entire communication device 101. The control unit 202 may control the entire communication device 101 by cooperation of a program and an OS (Operating System) stored in the storage unit 201. Alternatively, the control unit 202 may include a plurality of processors such as a multi-core processor and may control the entire communication device 101 by using the plurality of processors.

Further, the control unit 202 controls a function unit 203 to execute a predetermined process such as capturing an image, printing, or projection. The function unit 203 is a hardware component for allowing the communication device 101 to execute a predetermined process. For example, when the communication device 101 is a camera, the function unit 203 is an image capturing unit and performs an image capturing process. For example, when the communication device 101 is a printer, the function unit 203 is a printing unit and performs a printing process. For example, when the communication device 101 is a projector, the function unit 203 is a projection unit and performs a projection process. The data to be processed by the function unit 203 may be data stored in the storage unit 201 or data received from any other communication device via a communication unit 206 described below.

An input unit 204 accepts various operations from a user. An output unit 205 provides various outputs to the user. The outputs provided by the output unit 205 include at least one of screen display, audio output through speakers, vibration output, and so on. Both the input unit 204 and the output unit 205 may be implemented as a single module, such as a touch panel.

The communication unit 206 controls wireless communication conforming to the IEEE 802.11 series or controls TCP/IP communication or the like. Further, the communication unit 206 controls an antenna 207 to transmit and receive a wireless signal for wireless communication. The communication device 101 communicates content such as image data, document data, or video data to other communication devices via the communication unit 206.

Figure 3:
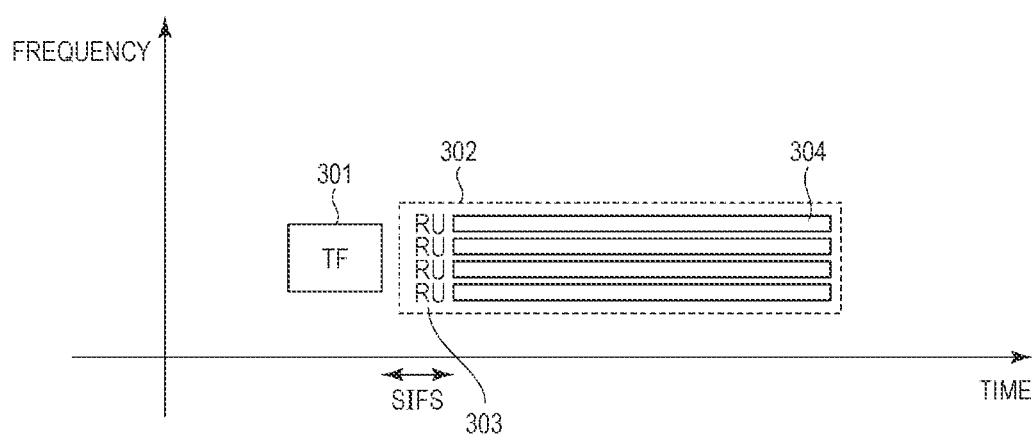
FIG. 3 is a diagram illustrating a relationship between frequencies and RUs.

Next, a method for IEEE 802.11ax communication, which is currently under examination, will be described with reference to FIG. 3. In IEEE 802.11ax, in addition to an existing scheme for providing communication using an entire single frequency channel, the following communication scheme is being examined. It is being examined that a width of 20 MHz, which has been previously used as one frequency channel, is divided into a plurality of frequency bands and that the plurality of frequency bands are simultaneously utilized by different communication devices for communication. Here, each of the plurality of frequency bands is referred to as an RU (Resource Unit). In this embodiment, one frequency channel 302 (with a width of 20 MHz) is divided into four RUs, and each RU 303 will be described as having a width of 5 MHz.

To enable a plurality of communication devices to simultaneously utilize a plurality of RUs, an access point transmits a trigger frame (TF) 301. A trigger frame is transmission permission to be granted to one or more communication devices. The trigger frame includes information on a communication device to which each RU is allocated. Specifically, the trigger frame includes a list in which RUs and AIDs, each of which is identification information of a communication device, are associated with each other. AID is an abbreviation of Association Identifier.

The communication device(s) granted transmission permission by a trigger frame transmits a data frame signal 304 in a designated RU when an SIFS time period has elapsed since the reception of the trigger frame. SIFS is an abbreviation of Short Inter Frame Space and is a minimum waiting time for a signal to be transmitted. AIFS, DIFS, PIFS, EIFS, or the like may be used instead of SIFS. AIFS is an abbreviation of Arbitration Inter Frame Space, and DIFS is an abbreviation of Distributed Inter Frame Space. PIFS is an abbreviation of Point Inter Frame Space, and EIFS is an abbreviation of Extended Inter Frame Space. In IEEE 802.11ax, when transmitting data signals, a plurality of communication devices perform communication in accordance with the OFDMA scheme to improve frequency utilization efficiency.

Further, the transmission power per unit frequency width (transmission power density) of a signal to be transmitted from the communication device(s) granted transmission permission is the same as the transmission power density for communication using the entire single frequency channel. Thus, the transmission power for transmitting a signal using one RU is lower than the transmission power for communication using the entire single frequency channel. Accordingly, for example, even if four communication devices each transmit a signal by using an RU, the transmission power per frequency channel can be equivalent to the transmission power for communication using the entire single frequency channel. Thus, for example, an excessive interference with other networks or an excess of statutorily specified power, which is caused by an excessive increase in transmission power per frequency channel, is avoidable.

Figure 4:
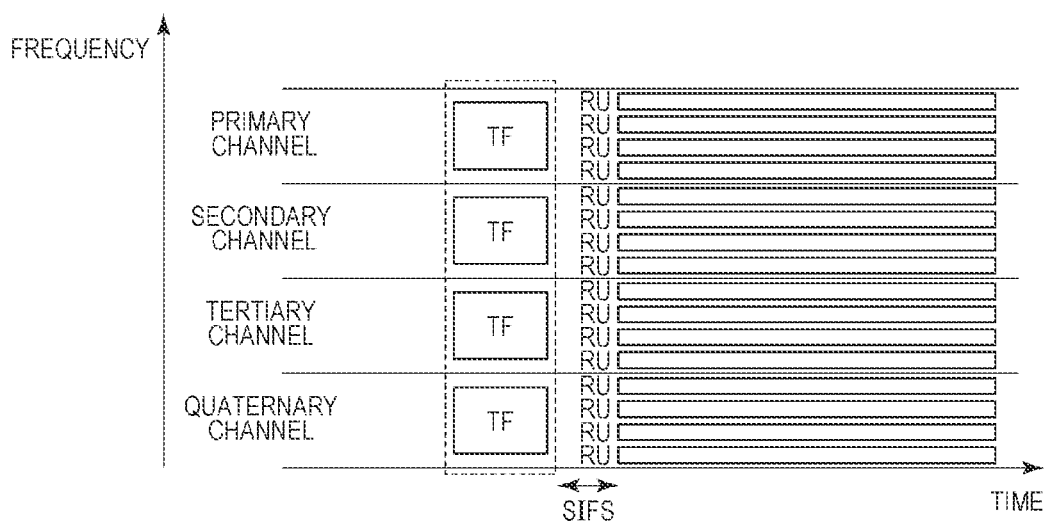
FIG. 4 is a diagram illustrating a relationship between frequencies and RUs.

IEEE 802.11ax also enables concurrent use of a plurality of frequency channels for communication. FIG. 4 illustrates the use of four frequency channels for communication. In this case, 16 RUs can be used.

Figure 5:
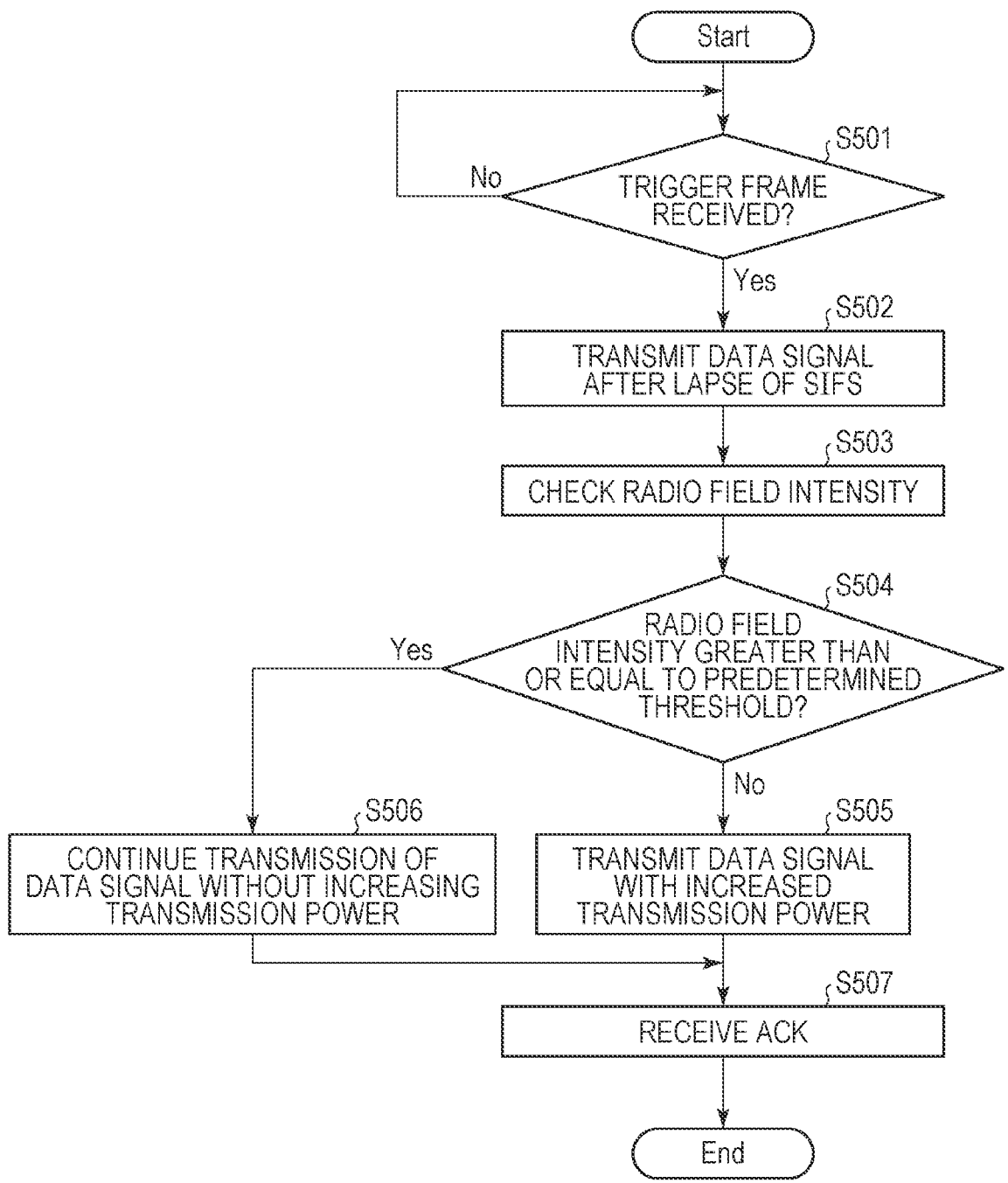
FIG. 5 is a flowchart implemented by the communication device.

FIG. 5 illustrates a flowchart of a process flow implemented by the control unit 202 reading and executing a program stored in the storage unit 201 when the communication device 101 transmits a data signal.

It should be noted that at least a portion of the flowchart illustrated in FIG. 5 may be implemented by hardware. In the implementation by hardware, for example, a predetermined compiler may be used to automatically generate a dedicated circuit on an FPGA in accordance with a program for implementing each step. FPGA is an abbreviation of Field Programmable Gate Array. Alternatively, a Gate Array circuit may be formed in a way similar to that on the FPGA to achieve implementation as hardware. The implementation may be achieved by an ASIC (Application Specific Integrated Circuit).

First, the communication device 101 waits for a trigger frame from the base station 110 (S501). Upon receipt of a trigger frame (Yes in S501), the communication device 101 transmits a data signal after the lapse of an SIFS time period (S502). Here, the communication device 101 transmits a data signal in an RU for the communication device 101, which is designated by the trigger frame.

Then, the communication device 101 checks, in parallel to the transmission of the data signal, a radio field intensity for an entire frequency channel that is being used by the communication device 101 to transmit the signal (S503). This check is performed by the communication unit 206 of the communication device 101 performing reception at the same time as transmission and checking a radio field intensity for an entire frequency channel that is being used by the communication device 101 to transmit the signal.

When the communication unit 206 of the communication device 101 separately includes a transmitter and a receiver, the transmitter may transmit the data signal and the receiver may check a radio field intensity for an entire frequency channel that is being used by the communication device 101 to transmit the signal.

In the check of the radio field intensity described above, the radio field intensity for the entire frequency channel may be checked only for data signals that are being communicated via wireless communication with the base station 110. This operation is achieved by determining a sum of the radio field intensities of data signals received in the respective RUs.

As a result of the check, if the radio field intensity for the entire frequency channel is less than a predetermined threshold (No in S504), the communication device 101 transmits the data signal with increased transmission power (S505). Here, the communication device 101 transmits the data signal with the power increased by an amount by which the radio field intensity for the entire frequency channel is short of the predetermined threshold.

The predetermined threshold described above is the same as a predetermined threshold used by the communication device 103 during carrier sensing.

If the radio field intensity for the entire frequency channel is less than the predetermined threshold, it is determined that no other communication device is performing communication on the frequency channel when the communication device 103 performs carrier sensing, and the communication device 103 transmits a signal. If the communication device 103 transmits a signal, the signal may interfere with the signal to be transmitted from the communication device 101, and an error can be generated. Thus, the communication device 101 increases the transmission power of the signal to enhance the radio field intensity for the entire frequency channel. Thus, it is more likely that carrier sensing performed by the communication device 103 estimates that any other communication device is performing communication on the frequency channel, which increases the probability that the communication device 103 will not transmit a signal. As a result, the generation of an error due to interference can be prevented.

The following two can be conceived as methods for allowing the communication device 101 to increase the transmission power. The first method is to increase the transmission power density for transmission in the RU for the communication device 101. The second method is to transmit a signal also in another RU in addition to the RU for the communication device 101. In this case, in the other RU, the communication device 101 may transmit the same data as that in the RU for the communication device 101 or different data from the RU for the communication device 101 or may transmit dummy data.

The first method enhances the transmission power of the data signal and can thus have an effect of further improving communication quality. The second method can improve the transmission power even when, for example, an upper limit is defined on the transmission power density for transmission in one RU due to hardware restrictions or statutory restrictions.

Which of these methods to use may be determined in advance or these methods may be switched between in accordance with the situation. For example, if the radio field intensity for the entire frequency channel is less than the predetermined threshold even when the transmission power density is enhanced within hardware restrictions or statutory restrictions, the second method may be performed or, otherwise, the first method may be performed. In addition, also when the second method is performed, the transmission power density in the RU for the communication device 101 may be enhanced as appropriate.

On the other hand, if the radio field intensity for the entire frequency channel is greater than or equal to the predetermined threshold (Yes in S504), the communication device 101 continues the transmission of the data signal without increasing the transmission power (S506).

When the transmission of the data signal is completed, the communication device 101 receives a confirmation response to the data signal, namely, Ack, from the base station (S507). The Ack is transmitted using the entire single frequency channel. The Ack also serves as a confirmation response to a data signal transmitted from another communication device 102 via another RU in synchronization with the transmission of the data signal from the communication device 101.

Then, the process illustrated in FIG. 5 ends. If data to be transmitted by the communication device 101 is generated or if there remains data to be transmitted, the process returns to the first step in FIG. 5.

In S503, instead of the radio field intensity for the entire frequency channel, the occupancy of each RU may be checked to determine the number of RUs that are not being used for signal transmission. In this case, in S504, the communication device 101 determines whether the number of RUs that are not being used for signal transmission is greater than or equal to a predetermined value. The predetermined value is assumed to be set such that the radio field intensity for the entire frequency channel is less than the predetermined threshold if the number of RUs that are not being used is greater than or equal to the predetermined value. Thus, if the number of RUs that are not being used is greater than or equal to the predetermined value, the radio field intensity for the entire frequency channel is greater than or equal to the predetermined threshold.

As a result of the determination in S504, if the number of RUs that are not being used for signal transmission is greater than or equal to the predetermined value, the process proceeds to S505; if the number of RUs that are not being used for signal transmission is less than the predetermined value, the process proceeds to S506. This can also achieve similar advantages.

Further, in this case, in S505, the amount of increase in transmission power may be controlled in accordance with the number of RUs that are not being used for signal transmission. For example, if it is determined that two RUs out of the four RUs are not being used, the transmission power is doubled; if it is determined that three RUs out of the four RUs are not being used, the transmission power is quadrupled. If it is not possible to quadruple the transmission power due to the constraints of the hardware of the communication device 101 or due to statutory constraints, the maximum transmission power that satisfies these constraints may be used.

Thus, preventing other communication devices from transmitting signals further in view of a balance to be achieved over the transmission power for communication using an entire single frequency channel can prevent the generation of an error due to interference with the other communication devices. That is, for example, an excessive interference with communication over other networks or an excess of statutorily specified power, which is caused by an excessive increase in transmission power for each frequency channel, is avoidable. In addition, interference with other communication devices is avoidable.

Instead of the number of RUs that are not being used for signal transmission, the number of RUs that are being used for signal transmission may be determined. Also in this case, a predetermined value is determined appropriately, and if the number of RUs that are being used for signal transmission is greater than or equal to the predetermined value, the process proceeds to S506; if the number of RUs that are being used for signal transmission is less than the predetermined value, the process proceeds to S505. Thus, similar advantages can be achieved.

Second Embodiment

In the first embodiment, the communication device 101 measures a radio field intensity and the availability of the RUs in parallel to the transmission of a data signal. In a second embodiment, the communication device 101 checks the availability of the RUs on the basis of information included in a trigger frame.

Also in the second embodiment, the system configuration and the hardware configuration of each device are similar to those in the first embodiment and will not be described herein.

FIG. 6 illustrates a flowchart of a process flow implemented by the control unit 202 reading and executing a program stored in the storage unit 201 when the communication device 101 transmits a data signal.

First, the communication device 101 waits for a trigger frame from the base station 110 (S601). Upon receipt of a trigger frame (Yes in S601), the communication device 101 analyzes the trigger frame and determines the number of RUs to be used to transmit a data signal (S602). As described in the first embodiment, the trigger frame includes a list in which AIDs, each of which is identification information of a communication device that is granted transmission permission, and RUs are associated with each other. Thus, the communication device 101 can determine the number of RUs to be used to transmit a data signal on the basis of the trigger frame.

If the number of RUs that are being used for signal transmission is greater than or equal to the predetermined value (Yes in S603), the communication device 101 transmits a data signal with transmission power similar to that in S502 in FIG. 5 (S604). On the other hand, if the number of RUs that are being used for signal transmission is less than the predetermined value (No in S603), the communication device 101 transmits a data signal with transmission power higher than the transmission power in S604 (S605).

For example, the predetermined value is 3. In this case, if it is determined that, of four RUs, three RUs are being used and one RU is not being used, the data signal is transmitted with the same transmission power density as that during communication using an entire single frequency channel. Thus, the transmission power of the communication device 101 is reduced to approximately a quarter of that during communication using the entire single frequency channel.

When it is determined that, of the four RUs, two RUs are being used and two RUs are not being used, the transmission power density is doubled. Thus, in this case, the transmission power of the communication device 101 is twice the transmission power in S502.

When it is determined that, of the four RUs, one RU is being used and three RUs are not being used, the transmission power density is quadrupled. Thus, in this case, the transmission power of the communication device 101 is four times the transmission power in S502. If it is not possible to quadruple the transmission power due to hardware constraints of the communication device 101 or due to statutory constraints, the maximum transmission power that satisfies these constraints may be used.

When the transmission of the data signal is completed, the communication device 101 receives a confirmation response to the data signal, namely, Ack, from the base station (S606). Then, the process illustrated in FIG. 6 ends. If data to be transmitted by the communication device 101 is generated or if there remains data to be transmitted, the process returns to the first step in FIG. 6.

In the way described above, the communication device 101 controls transmission power on the basis of information included in a trigger frame, and the generation of an error due to interference can be prevented.

In some cases, it is conceivable that communication devices utilize RUs in an autonomous and distributed way and that the base station 110 does not specify the devices that utilize the RUs. In such cases, the base station 110 assigns a value (for example, 0) of the AID in a trigger frame, indicating that a device that utilizes an RU is not specified. The base station 110 may not specify a device for any of the RUs or may not specify a device for some of the RUs.

If devices that utilize at least some of the RUs are not specified, the communication device 101 is unable to determine whether signals will be transmitted in the RUs to be utilized by the unspecified devices on the basis of the trigger frame. Thus, processes may be switched between such that the process illustrated in the first embodiment is performed in the case described above or, otherwise, the process illustrated in the second embodiment is performed.

If information on the AID included in the trigger frame is not successfully acquired, the process illustrated in the first embodiment may be performed or, otherwise, the process illustrated in the second embodiment may be performed or the process may proceed to the switching process described above. Cases where information on the AID included in the trigger frame is not successfully acquired include a case where the trigger frame does not include information on the AID, and a case where a communication error has caused the failure to obtain information on the AID included in the trigger frame.

Thus, if it is possible to check the availability of the RUs on the basis of information included in the trigger frame, power control can be performed on the basis of the information in the trigger frame; if it is not possible to check the availability of the RUs, power control can be performed on the basis of the measurement results of the radio field intensity or the availability of the RUs. Accordingly, a power control process suitable for a trigger frame can be performed.

Third Embodiment

In the first and second embodiments, the communication device 101 checks the radio field intensity or the availability of the RUs. In a third embodiment, the base station 110 determines the transmission power of each communication device on the basis of the availability of the RUs.

Also in the third embodiment, the system configuration and the hardware configuration of each device are similar to those in the first embodiment and will not be described herein.

FIG. 7 illustrates a flowchart of a process flow implemented by the control unit 202 of the base station 110 reading and executing a program stored in the storage unit 201 of the base station 110 when the base station 110 transmits a trigger frame.

Before the process illustrated in FIG. 7, the base station 110 receives from the communication devices 101 and 102 a transmission request for a data signal. Then, the base station 110 determines, based on the received transmission request, communication devices that perform communication at the same timing and allocates an RU to each of the communication devices (S701). The base station 110 may determine communication devices that perform communication at the same timing on the basis of, in addition to the transmission request, the positions of the communication devices 101 and 102 or the radio wave environment.

Then, the base station 110 determines the transmission power of each communication device on the basis of the number of RUs used by the communication devices that perform communication at the same timing (S702). For example, when, of four RUs, two RUs are used and two RUs are not used, the base station 110 determines transmission power such that the transmission power density of each communication device becomes double. When, of the four RUs, one RU is used and three RUs are not used, the base station 110 quadruples the transmission power density of each communication device. Thus, in this case, the transmission power is four times the transmission power in S502. If it is not possible to quadruple the transmission power due to hardware constraints of the communication device 101 or due to statutory constraints, the maximum transmission power that satisfies these constraints may be used.

In the example described above, the respective transmission powers of the communication devices are the same, which is not intended to be limiting. The transmission power may differ from one communication device to another. In this case, the base station 110 determines the transmission power of each communication device such that a radio field intensity exceeding a predetermined threshold that is used by the communication device 103 during carrier sensing can be achieved for the entire frequency channel.

For example, the base station 110 obtains information on the hardware of each communication and determines the transmission power of each communication device on the basis of the obtained information. Consideration is given to a case where, for example, two RUs out of four RUs are utilized and transmission permission is granted to a device for which the transmission power density can be quadrupled and a device for which the transmission power density is not increasable. In this case, the base station 110 determines that the transmission power is multiplied by three for the device for which the transmission power density can be quadrupled, and determines that the transmission power density is multiplied by one for the device for which the transmission power density is not increasable. Thus, a radio field intensity exceeding a predetermined threshold that is used by the communication device 103 during carrier sensing can be achieved for the entire frequency channel while the hardware constraints of each device are satisfied.

Further, for example, the base station 110 may determine each transmission power on the basis of the reception quality of a signal from each communication device. Specifically, the base station 110 determines that the transmission power is increased for a device with low reception quality, compared with a device with high reception quality. Also in this case, the base station 110 determines the transmission power of each communication device such that a radio field intensity exceeding a predetermined threshold that is used by the communication device 103 during carrier sensing can be achieved for the entire frequency channel. As the reception quality, the signal intensity may be used or a result of channel estimation between the base station 110 and communication devices (for example, a value determined by the calculation of an eigenvalue of a channel matrix). Thus, the transmission power of a device with low reception quality is increased to enhance reception quality, and a radio field intensity exceeding a predetermined threshold that is used by the communication device 103 during carrier sensing can be achieved for the entire frequency channel.

Further, for example, the base station 110 may randomly determine the transmission power of each communication device while achieving, for the entire frequency channel, a radio field intensity exceeding a predetermined threshold that is used by the communication device 103 during carrier sensing. Thus, power consumption required for each communication device to transmit data can be made approximately uniform, on average, over a long period of time.

Then, the base station 110 transmits a trigger frame including the transmission power of each communication device determined in S702 (S703). Note that a device for which the transmission power is determined in S702 not to be increased may not be given an instruction regarding transmission power. Additionally, the base station 110 may notify each communication device of the transmission power of each communication device, which is determined in S702, as a separate signal from the trigger frame.

Upon receipt of the trigger frame, each communication device transmits a data signal on the basis of the transmission power specified in the trigger frame.

This can prevent the generation of an error due to interference, further in view of a balance to be achieved over the transmission power for communication using an entire single frequency channel, without requiring each communication device to determine the transmission power.

Also in the embodiment described above, the following two can be conceived as methods for allowing a communication device to increase the transmission power. The first method is to increase the transmission power density for transmission in the RU for the communication device. The second method is to transmit a signal also in another RU in addition to the RU for the communication device. In this case, the base station 110 designates which communication device uses an RU and which RU is to be used. For example, a device that is requested by each device to transmit a large amount of data is determined to be a device that transmits a signal also in another RU, and this device is instructed to also use the other RU. Then, the device transmits data by using the two RUs. This can enhance the transmission power for the entire frequency channel and can enhance data transmission efficiency.

Which of the methods to use as a method for allowing a communication device to increase the transmission power may be determined in advance, or the methods may be switched between in accordance with the situation. For example, if the radio field intensity for the entire frequency channel is less than the predetermined threshold even when the transmission power density is enhanced within hardware restrictions or statutory restrictions, the second method may be performed or, otherwise, the first method may be performed.

In the embodiment described above, furthermore, the transmission power of each communication device is determined on the basis of the availability of the RUs. However, this is not intended to be limiting. Any other information processing device different from the base station may determine communication devices that perform communication at the same timing by the base station 110, on the basis of a transmission request from each communication device, allocate an RU to each of the communication devices, and further determine the transmission power. In this case, the content of the determination is transmitted to the communication devices via the base station 110. This can also achieve similar advantages.

The present invention can also be implemented using a process for providing a program that implements one or more functions in the embodiments described above to a system or device via a network or a storage medium and for reading and executing the program by one or more processors in a computer of the system or device. The present invention can also be implemented by a circuit (for example, an ASIC) that implements one or more functions.

The present invention is not limited to the embodiments described above and can be variously changed and modified without departing from the spirit and scope of the present invention. Thus, the following claims are appended to make the scope of the present invention public.

According to the present invention, when a signal is to be transmitted in one or more frequency bands of a frequency channel including a plurality of frequency bands, the signal can be transmitted with transmission power suitable for the entire frequency channel condition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

I claim:

1. A communication apparatus that performs communication that conforms to an IEEE802.11 series standard in accordance with an OFDMA (Orthogonal Frequency Division Multiple Access) scheme, comprising:
   one or more memories having instructions stored therein; and one or more processors that, upon execution of the instructions, are configured to:
   receive, from a base station, a trigger frame that includes first information in which a plurality of resource units obtained by dividing a frequency channel is associated with AIDs (Association Identifiers) that are identification information of a plurality of communication apparatuses, wherein the first information includes a list that includes at least first correspondence relationship information, in which a first AID is associated with a first resource unit, and second correspondence relationship information, in which a second AID is associated with a second resource unit, the second AID being different from the first AID, and the second resource unit being different from the first resource unit;
   measure reception signal intensity of a signal communicated between the communication apparatus and the base station;
   determine, based on (i) second information that is acquired from the received trigger frame and (ii) the measured reception signal intensity, transmission power for the communication apparatus to perform signal transmission to the base station;
   transmit a signal in a resource unit that is specified using an AID for the communication apparatus in the trigger frame, wherein the signal is transmitted with the determined transmission power; and
   control the signal transmission so that the signal is transmitted with first transmission power in a case where the measured reception signal intensity is a first intensity and the signal is transmitted with second transmission power that is higher than the first transmission power in a case where the measured reception signal intensity is a second intensity that is less than the first intensity,
   wherein, upon lapse of SIFS (Short InterFrame Space) time after receiving the trigger frame, the signal is transmitted in the specified resource unit.

2. The communication apparatus according to claim 1, further comprising:
   an antenna,
   wherein the signal is transmitted by using the antenna.

3. The communication apparatus according to claim 1, wherein the frequency channel has a width of 20 MHz.

4. The communication apparatus according to claim 1, wherein each of the plurality of resource units has a width of 5 MHz.

5. A method for controlling a communication apparatus that performs communication that conforms to an IEEE802.11 series standard in accordance with an OFDMA (Orthogonal Frequency Division Multiple Access) scheme, comprising:

receiving, from a base station, a trigger frame that includes first information in which a plurality of resource units obtained by dividing a frequency channel is associated with AIDs (Association Identifiers) that are identification information of a plurality of communication apparatuses, wherein the first information includes a list that includes at least first correspondence relationship information, in which first AID is associated with a first resource unit, and second correspondence relationship information, in which second AID is associated with a second resource unit, the second AID being different from the first AID, and the second resource unit being different from the first resource unit;

measuring reception signal intensity of a signal communicated between the communication apparatus and the base station;

determining, based on (i) second information that is acquired from the received trigger frame and (ii) the measured reception signal intensity, transmission power for the communication apparatus to perform signal transmission to the base station;

transmitting a signal in a resource unit that is specified using an AID for the communication apparatus in the trigger frame, wherein the signal is transmitted with the determined transmission power; and controlling the signal transmission so that the signal is transmitted with first transmission power in a case where the measured reception signal intensity is a first intensity and the signal is transmitted with second transmission power that is higher than the first transmission power in a case where the measured reception signal intensity is a second intensity that is less than the first intensity, wherein, upon lapse of SIFS (Short InterFrame Space) time after receiving the trigger frame, the signal is transmitted in the specified resource unit.

6. A non-transitory computer readable storage medium storing instructions that execute a method for controlling a communication apparatus that performs communication that conforms to an IEEE802.11 series standard in accordance with an OFDMA (Orthogonal Frequency Division Multiple Access) scheme, the method comprising:

receiving, from a base station, a trigger frame that includes first information in which a plurality of resource units obtained by dividing a frequency channel is associated with AIDs (Association Identifiers) that are identification information of a plurality of communication apparatuses, wherein the first information includes a list that includes at least first correspondence relationship information, in which first AID is associated with a first resource unit, and second correspondence relationship information, in which second AID is associated with a second resource unit, the second AID being different from the first AID, and the second resource unit being different from the first resource unit;

measuring reception signal intensity of a signal communicated between the communication apparatus and the base station;

determining, based on (i) second information that is acquired from the received trigger frame and (ii) the measured reception signal intensity, transmission power for the communication apparatus to perform signal transmission to the base station;

transmitting a signal in a resource unit that is specified using an AID for the communication apparatus in the trigger frame, wherein the signal is transmitted with the determined transmission power; and controlling the signal transmission so that the signal is transmitted with first transmission power in a case where the measured reception signal intensity is a first intensity and the signal is transmitted with second transmission power that is higher than the first transmission power in a case where the measured reception signal intensity is a second intensity that is less than the first intensity, wherein, upon lapse of SIFS (Short InterFrame Space) time after receiving the trigger frame, the signal is transmitted in the specified resource unit.

7. A base station that performs communication that conforms to an IEEE802.11 series standard in accordance with an OFDMA (Orthogonal Frequency Division Multiple Access) scheme, comprising:

one or more memories having instructions stored therein; and one or more processors that, upon execution of the instructions, are configured to:

transmit a trigger frame that includes first information in which a plurality of resource units obtained by dividing a frequency channel is associated with AIDs (Association Identifiers) that are identification information of a plurality of communication apparatuses, wherein the first information includes a list that includes at least first correspondence relationship information, in which first AID is associated with a first resource unit, and second correspondence relationship information, in which second AID is associated with a second resource unit, the second AID being different from the first AID, and the second resource unit being different from the first resource unit; and receive a signal in a resource unit that is specified using an AID for a communication apparatus among the plurality of communication apparatuses in the trigger frame, wherein the signal is transmitted with transmission power that is determined by the communication apparatus based on (i) second information that is acquired from the trigger frame and (ii) reception signal intensity of a signal communicated between the communication apparatus and the base station, the reception signal intensity being measured by the communication apparatus, wherein the base station receives the signal transmitted from the communication apparatus, after SIFS (Short InterFrame Space) time has elapsed since receipt of the trigger frame, by using first transmission power in a case where the measured reception signal intensity is a first intensity, and the base station receives the signal transmitted from the communication apparatus, after the SIFS time has elapsed since receipt of the trigger frame, by using second transmission power that is higher than the first transmission power in a case where the measured reception signal intensity is a second intensity that is less than the first intensity.

8. The base station according to claim 7, further comprising:
an antenna;
wherein the signal is received by using the antenna.

9. The base station according to claim 7, wherein the frequency channel has a width of 20 MHz.

10. The base station according to claim 7, wherein each of the plurality of resource units has a width of 5 MHz.

11. A method for controlling a base station that performs communication that conforms to an IEEE802.11 series standard in accordance with an OFDMA (Orthogonal Frequency Division Multiple Access) scheme, the method comprising:
transmitting a trigger frame that includes first information in which a plurality of resource units obtained by dividing a frequency channel is associated with AIDs (Association Identifiers) that are identification information of a plurality of communication apparatuses, wherein the first information includes a list that includes at least first correspondence relationship information, in which first AID is associated with a first resource unit, and second correspondence relationship information, in which second AID is associated with a second resource unit, the second AID being different from the first AID, and the second resource unit being different from the first resource unit; and
receiving a signal in a resource unit that is specified using an AID for a communication apparatus among the plurality of communication apparatuses in the trigger frame, wherein the signal is transmitted with transmission power that is determined by the communication apparatus based on (i) second information that is acquired from the trigger frame and (ii) reception signal intensity of a signal communicated between the communication apparatus and the base station, the reception signal intensity being measured by the communication apparatus;
wherein the base station receives the signal transmitted from the communication apparatus, after SIFS (Short InterFrame Space) time has elapsed since receipt of the trigger frame, by using first transmission power in a case where the measured reception signal intensity is a first intensity, and the base station receives the signal transmitted from the communication apparatus, after the SIFS time has elapsed since receipt of the trigger frame, by using second transmission power that is higher than the first transmission power in a case where the measured reception signal intensity is a second intensity that is less than the first intensity.

12. A non-transitory computer readable storage medium storing instructions that execute a method for controlling a base station that performs communication that conforms to an IEEE802.11 series standard in accordance with an OFDMA (Orthogonal Frequency Division Multiple Access) scheme, the method comprising:
transmitting a trigger frame that includes first information in which a plurality of resource units obtained by dividing a frequency channel is associated with AIDs (Association Identifiers) that are identification information of a plurality of communication apparatuses, wherein the first information includes a list that includes at least first correspondence relationship information, in which first AID is associated with a first resource unit, and second correspondence relationship information, in which second AID is associated with a second resource unit, the second AID being different from the first AID, and the second resource unit being different from the first resource unit; and
receiving a signal in a resource unit that is specified using an AID for a communication apparatus among the plurality of communication apparatuses in the trigger frame, wherein the signal is transmitted with transmission power that is determined by the communication apparatus based on (i) second information that is acquired from the trigger frame and (ii) reception signal intensity of a signal communicated between the communication apparatus and the base station, the reception signal intensity being measured by the communication apparatus;
wherein the base station receives the signal transmitted from the communication apparatus, after SIFS (Short InterFrame Space) time has elapsed since receipt of the trigger frame, by using first transmission power in a case where the measured reception signal intensity is a first intensity, and the base station receives the signal transmitted from the communication apparatus, after the SIFS time has elapsed since receipt of the trigger frame, by using second transmission power that is higher than the first transmission power in a case where the measured reception signal intensity is a second intensity that is less than the first intensity.

* * * * *